United States Patent [19]

Bassett et al.

[11] Patent Number: 5,023,469
[45] Date of Patent: Jun. 11, 1991

[54] INTERLOCK SYSTEM FOR BYPASS/ISOLATION AUTOMATIC TRANSFER SWITCH

[75] Inventors: Ronald M. Bassett, Chicago; Carl Kyrk, Stickney, both of Ill.

[73] Assignee: Zenith Controls, Inc., Chicago, Ill.

[21] Appl. No.: 475,031

[22] Filed: Feb. 5, 1990

[51] Int. Cl.⁵ .............................................. H02J 9/00
[52] U.S. Cl. ........................................................ 307/64
[58] Field of Search ..................... 200/18, 50 C, 50 A, 200/50 AA; 361/345, 335-344; 307/64, 80

[56] References Cited

U.S. PATENT DOCUMENTS 4,021,678  5/1977  Moakler et al. ...................... 307/64
4,398,097  8/1983  Schell et al. .......................... 307/64
4,423,336 12/1983  Iverson et al. ........................ 307/64

OTHER PUBLICATIONS

Zenith Controls, Inc., Instruction Manual, ZBTSH Series Bypass/isolation Transfer Switch, Jan., 1989.

Primary Examiner—J. R. Scott
Attorney, Agent, or Firm—Rockey and Rifkin

[57] ABSTRACT

A simplified mechanical and electromechanical interlock system connecting automatic transfer and bypass-/isolation switches in a bypass/isolation automatic transfer switch is provided, whereby the risk of hazard resulting from the misconnection of power sources through automatic transfer and bypass/isolation switches is reduced by prevention of closure of the two switches into opposite or dead sources is prevented. Related retractable table structure is also provided for moving the automatic transfer switch from a frame in which the switches are housed.

15 Claims, 7 Drawing Sheets

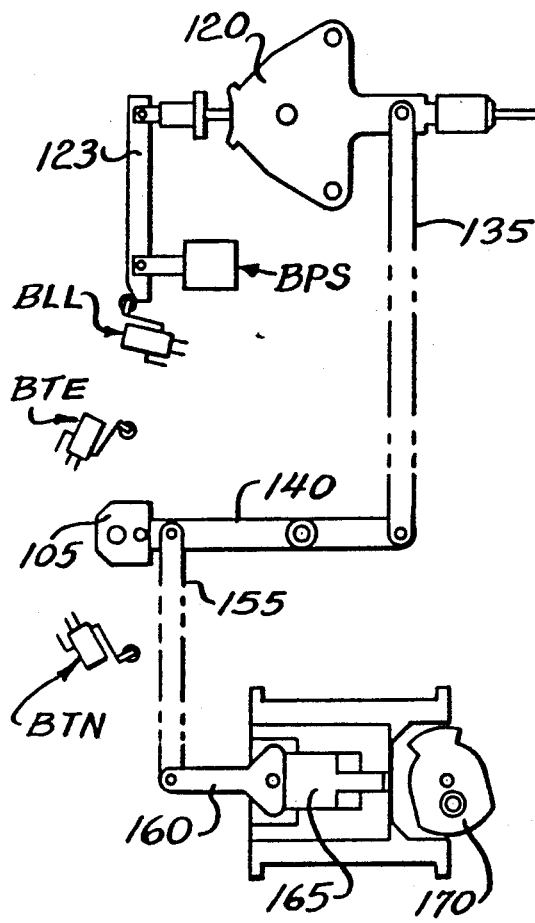
FIG.2
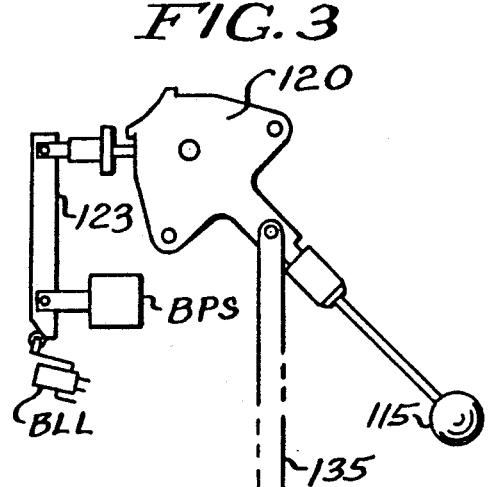
FIG.3
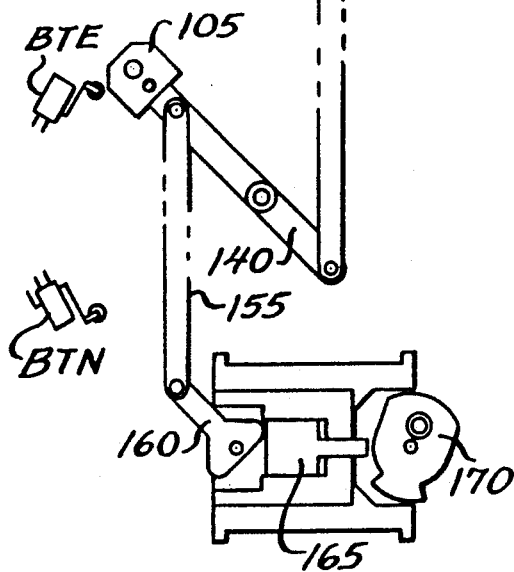

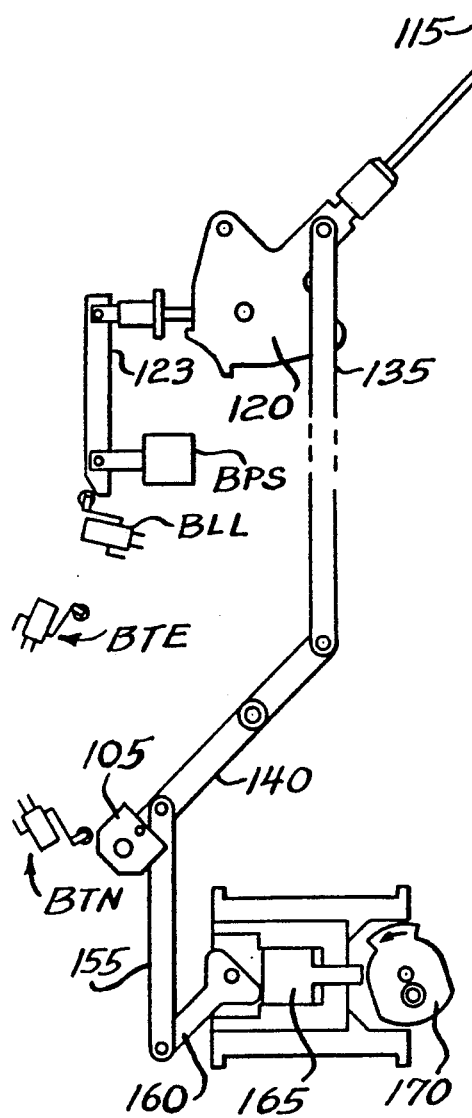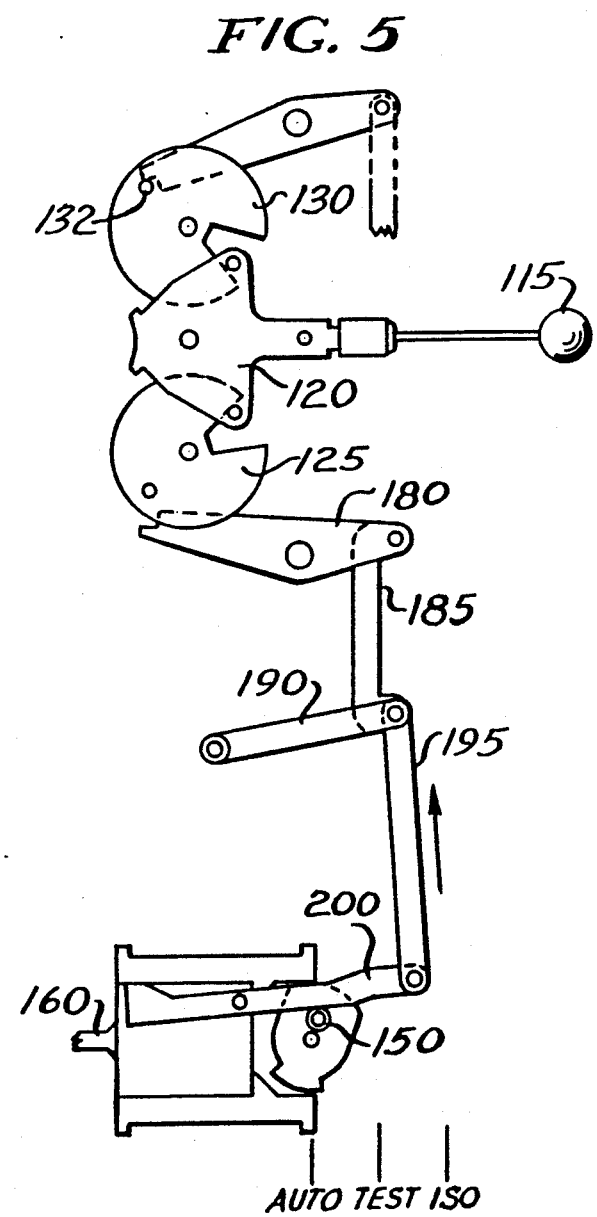
FIG. 4
FIG. 5

INTERLOCK SYSTEM FOR BYPASS/ISOLATION AUTOMATIC TRANSFER SWITCH

The present invention relates to a mechanical interlock system for bypass/isolation automatic transfer switches, whereby bypass/isolation automatic "transfer switches" are necessarily connected to the same power source as a consequence of the mechanical interlock system.

BACKGROUND OF THE INVENTION

Automatic transfer switches are used to vary the source of electrical power for a particular consumer application between a primary source, usually called the "normal" source, and a secondary source, usually called the "emergency" source. The normal source is most often a private or public supplier of electricity, generating electricity from a power station to many consumers. The emergency source is most often a generator located at the consumer's site, and is designed to supply electrical power for relatively short periods in the event of a failure at the normal source. Power is supplied from these sources through the switch to a load operated by a consumer.

Automatic transfer switches ar thus often found in hospitals and other consumer locations where a continuous supply of electrical power is required. A power failure or power reduction, without emergency backup, can have serious and possibly fatal consequences, and the reliability of the means for switching between power sources is of high importance. Moreover, because the time involved in transferring between the failed normal source and the emergency source must be short in such applications, it is necessary that the switching means for transferring between automatic and emergency is rapid. Automatic transfer switches employ a variety of power detecting means to achieve this automatic switching after a detection of some preset criterion (e.g., power loss or reduction). The portion of the bypass/isolation automatic transfer switch that engages in this switching operation is known as the automatic transfer switch.

Bypass/isolation automatic transfer switches having such characteristics are well known in the art. To maintain these characteristics, however, it is necessary that the switches are properly and regularly maintained. Also, like all electromechanical devices, automatic transfer switches are also occasionally in need of repair as a result of an electrical or mechanical failure. In both service environments, the person servicing the switch is required to open the automatic transfer switch and access or remove the actual switching unit connected to the normal and emergency power sources. High voltages and amperages typically pass through the automatic transfer switch, creating a hazardous environment for the service person and requiring the exercise of great care to maintain the safe operation of the automatic transfer switch.

When the bypass/isolation automatic transfer switch is serviced, power continues to be supplied from the primary or secondary source through a bypass/isolation switch. The bypass/isolation switch is typically, though not necessarily, located in the same physical housing as the automatic transfer switch.

The bypass/isolation switch is operated similarly to the automatic transfer switch, except that the transfer occurs as the result of manual switching, rather than automatic switching. A shift in operation from the automatic transfer switch to the bypass/isolation switch therefore requires that the bypass/isolation switch be connected to the same source as the automatic transfer switch, so that a continuous power supply is provided to the consumer. The automatic transfer switch may then be disconnected for service. After servicing, the automatic transfer switch is reconnected to the same source as the bypass/isolation switch, and the bypass/isolation switch is then disconnected so that power is supplied only through the automatic transfer switch.

This operation, however, presents several hazards against which caution must be taken. Particularly, it is necessary that the automatic transfer switch and the bypass/isolation switch be connected to the same source when both are supplying power to the load, since the primary and secondary sources can typically be expected to be out of phase with respect to one another. The hazards created by the connection of the out of phase sources through the automatic transfer and bypass/isolation switches include explosion, fire, electric shock and load equipment damage.

Previously, methods and mechanisms to avoid the improper connection of sources through the automatic transfer and bypass/isolation switches were generally mechanical, and more complex than that found in the present invention. These interlocks required the user to set numerous manual switches designating the locations of sources in both the bypass/isolation automatic transfer switch. This additional complexity resulted in not only an inefficient interlock system, but also greater risk of interlock failure and resultant hazards.

SUMMARY OF THE INVENTION

The present invention relates to a simplified mechanical and electromechanical interlock system connecting the automatic transfer and bypass/isolation switches in an bypass/isolation automatic transfer switch, whereby the risk of hazard resulting from the misconnection of power sources through the automatic transfer and bypass/isolation switches is reduced.

A safety interlock system is provided for a bypass/isolation automatic transfer switch capable of switching between two opposite power sources, the power sources being live or dead, the interlock system comprising an automatic transfer switch for automatically switching between the power sources according to a preset criterion, the automatic transfer switch be movable outward from a frame housing the automatic transfer switch; a manually operated bypass/isolation switch for bypassing the automatic transfer switch; mechanical interlock means for preventing the automatic transfer switch and the bypass/isolation switch from being mechanically closed into different sources at the same time; and electromechanical interlock means operating with the mechanical interlock means for preventing the bypass/isolation switch, when closed into a live source, from switching to closure into an opposite dead source, the electromechanical interlock means further comprising means for preventing switching by the automatic transfer switch during movement of the automatic transfer switch.

It is thus an object of the present invention to provide an interlock means whereby the bypass/isolation automatic transfer switches cannot be connected to different sources at the same time.

Another object of the invention is to provide means for preventing the bypass/isolation switch, when closed into a live source, from switching to closure into an opposite dead source.

Yet another object of the invention to provide an interlock means preventing the removal, isolation or testing of the automatic transfer switch without the bypass/isolation switch being closed into the same source.

It is another object of the invention to provide an interlock means such that the automatic transfer switch, having been removed from the load for, e.g., service, cannot be reinstalled in to a different source than the bypass/isolation switch.

These and other objects of the present invention will become apparent from the detailed description of the invention set forth below.

BRIEF DESCRIPTION OF THE DRAWINGS

FIG. 2 shows a simplified view of the interlock mechanism with the bypass/isolation switch open, such that the interlock mechanism is not engaged and the automatic transfer switch functions freely FIG. 3 shows a simplified view of the interlock mechanism with the bypass closed to normal, such that the interlock mechanism limits the closing of the automatic transfer switch to normal and prevents switching to emergency.

FIG. 4 shows a simplified view of the interlock mechanism with the bypass closed to emergency, such that the interlock mechanism limits the closing of the automatic transfer switch to emergency and prevents switching to normal.

FIG. 5 shows the function of the interlock system preventing improper closure of the bypass to the emergency source.

DETAILED DESCRIPTION OF THE INVENTION

Figure 1:
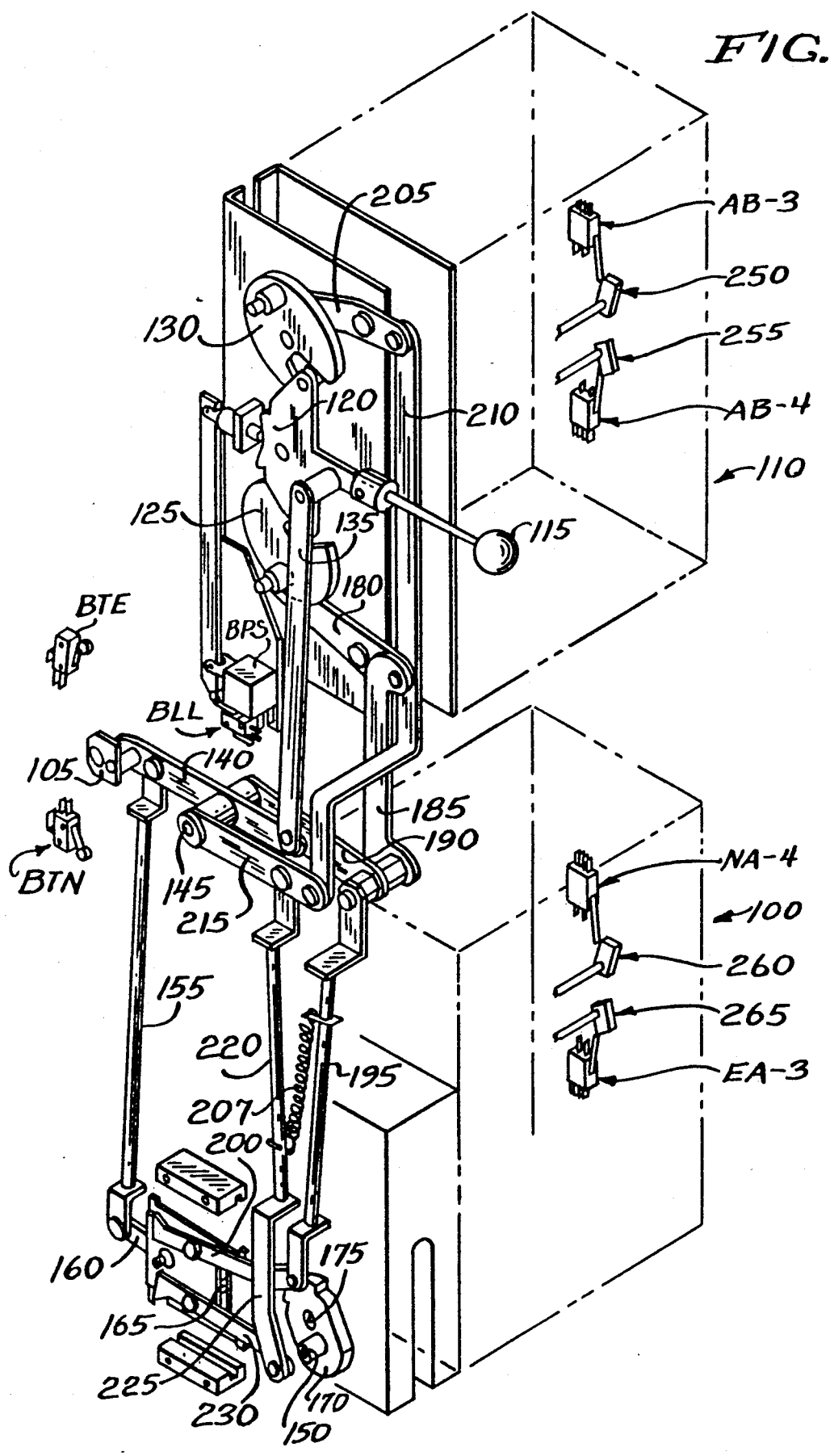
FIG. 1 is a perspective drawing of the interlock mechanism of the present invention.

Referring to FIG. 1, a bypass/isolation automatic transfer switch includes automatic transfer switch 100 and bypass/isolation switch 110. Automatic transfer switch 100 is connected to bypass/isolation switch 110 by a plurality of connecting elements, including cams, rods, pins and linkages, which will be described in further detail. These connecting elements comprise the interlock system of the present invention.

Mechanical interlock means are included to prevent the automatic transfer switch and the bypass/isolation switch from being mechanically closed into different power sources at the same time. This mechanical interlock is described in the following paragraphs.

When automatic transfer switch 100 is to be serviced, a manually operated bypass lever 115 is employed to select a source of power from either a normal source or an emergency source; as will be shown below, bypass-/isolation switch 110 may be closed only into the same source as automatic transfer switch 100 when the latter is operating in AUTO (i.e., automatically), as a result of the interlock system. Bypass lever 115 is either raised or lowered from an "open" position (wherein it is not closed into either the normal or emergency power source) to the selected power source. Bypass lever 115 is connected to a pivotally mounted cam driver 120, which engages either normal cam 125 or emergency cam 130, depending upon which power source is selected.

Cam driver 120 is operably connected by rod 135 to rod 140, which is pivotally mounted on pin 145 connected to the bypass/isolation switch frame. Rod 155 is operably attached to rod 140 at its upper end, and is operably connected to slide lock 160 at the other end. Lock 165 operably engage spring loaded slide lock 160 with automatic transfer switch cam 170, which is mounted on one end of automatic transfer switch operating shaft 175 and rotates therewith.

Normal cam driver 125 is engaged or disengaged by one end of lock pawl 180. Lock pawl 180 is connected at its other end to normal interlock linkage 185, which is operably connected to rod 190. Rod 190 is pivotally mounted at one end on pin 145, and is operably attached at its other end to rod 195. Rod 195 is operably attached to normal driving rod 200 which operably engages automatic transfer switch cam 170 via roller 150.

Similarly, emergency cam driver 130 is engaged or disengaged by lock pawl 205 to one end of interlock linkage 210. The other end of emergency interlock linkage 210 is operably connected to rod 215, which is pivotally mounted on pin 145. Rod 220 is operably connected to rod 215 at one end and at the other end to emergency driving rod 225. Emergency driving rod 225 operably engages automatic transfer switch cam 170 with rod 230 via roller 150.

Rods 220 and 195 are interconnected by spring 207 so as to lock the mechanical interlocks in the closed position. As a result of the biasing action of spring 207, lock pawls 205 and 180 are biased to engage pins 127 and 132 on cams 125 and 130, respectively, thereby locking the cams and preventing inadvertent switching. Movement of bypass handle 115 to switch the bypass from one source to the other, or to open, requires the operator of automatic transfer switch cam 170 to apply force to overcome the locking action resulting from spring 207. In addition, movement of the bypass/isolation switch 110 from one source to the other ("destination source") requires that automatic transfer switch 100 be closed into the destination source; this results in the appropriate lock pawl 205 or 180 unlocking its associated cam 125 or 130, permitting movement of bypass handle 115 and bypass/isolation switch 110 to the destination source.

The operation of interlock mechanism to prevent improper source connection via the bypass/isolation automatic transfer switches is illustrated in FIGS. 2 though 4. In FIG. 2, bypass lever 115 is shown in the open position, i.e., no power is supplied through bypass-/isolation switch 110 from either the normal or emergency source. With bypass lever 115 in this position, rod 135 positions rods 140 and 155 such that slide lock 160 permits lock 165 to retract as a result of spring loading. Automatic transfer switch cam 170 is left free to rotate, allowing automatic transfer switch 100 to lock into either the normal or the emergency source, according to a preset criterion. In the positions shown, the automatic transfer switch is closed into the emergency source.

FIG. 3 shows the interlock mechanism in simplified view in the configuration where the bypass/isolation automatic transfer switches are closed to the normal source. In this instance, rods 135, 140, and 155 are positioned to rotate slide lock 160 thereby locking automatic transfer switch cam 170 with lock 165. By locking automatic transfer switch cam 170 into the normal source, automatic transfer switch 100 is prevented from switching to emergency while bypass 110 is closed into normal.

Likewise, FIG. 4 shows the interlock mechanism in simplified view in the configuration where the bypass-/isolation automatic transfer switches are closed to the emergency power source, and slide lock 160 is positioned to prevent the automatic transfer switch cam 170 from rotating. This prevents automatic transfer switch 100 from switching to normal while bypass/isolation switch 110 is closed into emergency.

Figure 6:
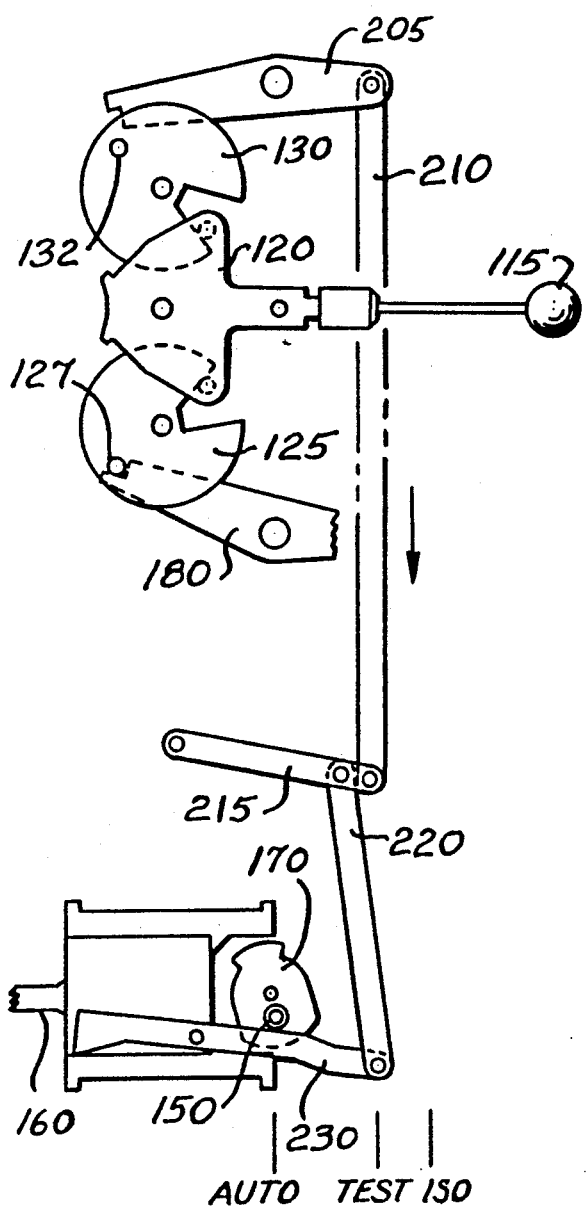
FIG. 6 shows the function of the interlock system preventing improper closure of the bypass to the normal source.

FIGS. 5 and 6 illustrate the function of interlock system to prevent improper closure of bypass/isolation switch 110 to a power source different from that to which the automatic transfer switch is closed. Thus, in FIG. 5, with bypass open, automatic transfer switch 100 is closed to normal, roller 150 lifts rod 200 and, via the linkages described above, rotates lock pawl 205 into engagement with pin 132. This configuration prevents bypass lever 115 from being raised from the open position (as shown) to the emergency position, since the engagement of lock pawl 205 by pin 132 prevents the rotation of emergency cam 130. Thus, bypass handle 115 may not be moved to place bypass/isolation switch 110 into emergency. At the same time, however, bypass handle 115 may be moved into the normal position, since lock pawl 180 is not engaged by pin 127 on normal cam 125.

Conversely, as shown in FIG. 6, with bypass/isolation switch 110 open, automatic transfer switch 100 is shown closed into emergency, lifting forcing rod 230 down by roller 150. Through the linkages described above, this action raises lock pawl 205 out of engagement by pin 132. Emergency cam 130 is thus free to rotate. At the same time, however, lock pawl 180 is engaged by pin 127 on normal cam 125, preventing rotation of the cam. This configuration prevents bypass handle 115 from being lowered to the normal position. As a result, bypass/isolation switch 110 may be moved from the open position (shown) to only the emergency position.

Figure 10:
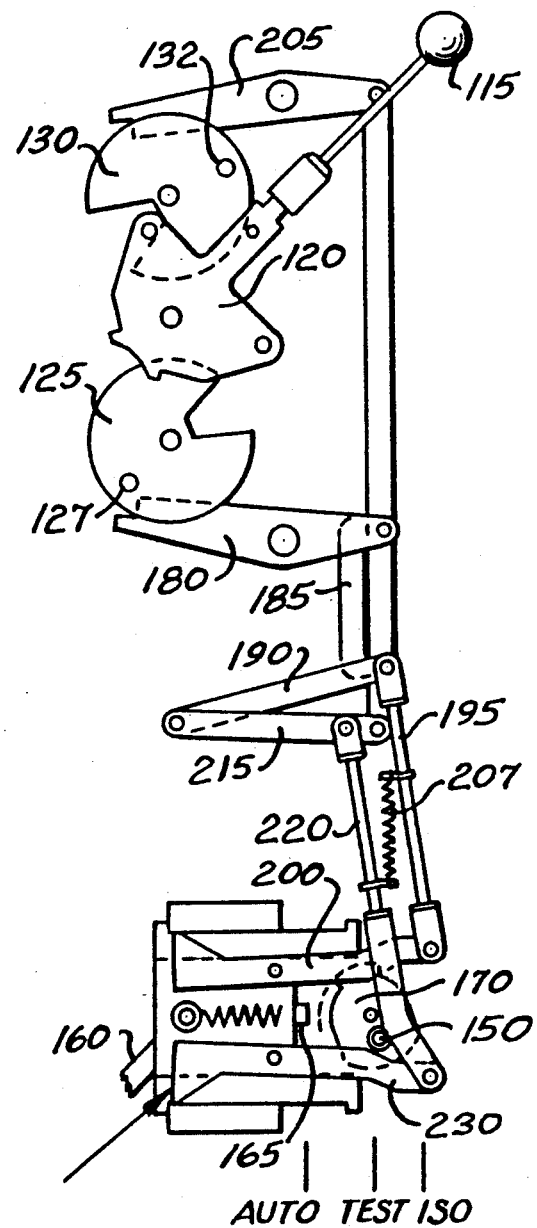
FIG. 10 shows the mechanical interlock system when the automatic transfer switch has been moved from the AUTO operating position to the TEST position.

FIGS. 5 and 6 show the operation of the interlock system when automatic transfer switch 100 is operating in the AUTO position, i.e., switching between normal and emergency is accomplished automatically. Automatic transfer switch 100 is removable from its frame, however, as a result of the operation of automatic transfer switch location handle 400. Other locations are TEST and ISOLATE, in which automatic transfer switch is moved forward out of its frame. As shown in FIG. 10, the mechanical interlock system moves forward with automatic transfer switch 100 until the switch is in the TEST position, thereby preventing inadvertent switching before automatic transfer switch 100 is disconnected from the power sources. Thus, automatic transfer switch cam 170 is unable to freely rotate, without restriction from lock 165, until automatic transfer switch 100 is moved to the TEST or ISOLATE position.

In addition to the mechanical interlock system described, an electromechanical interlock system is further provided and operates in conjunction with the mechanical interlock system to provide additional means for prevention of improper operation of the bypass/isolation automatic transfer switch.

The electromechanical interlock means described in the following paragraphs uses electric switches and electrically operated devices, in addition to components of the mechanical interlock just described, to prevent the bypass isolation switch from being switched from a live source to a dead source and other functions as will be apparent from the disclosure below.

Figure 7:
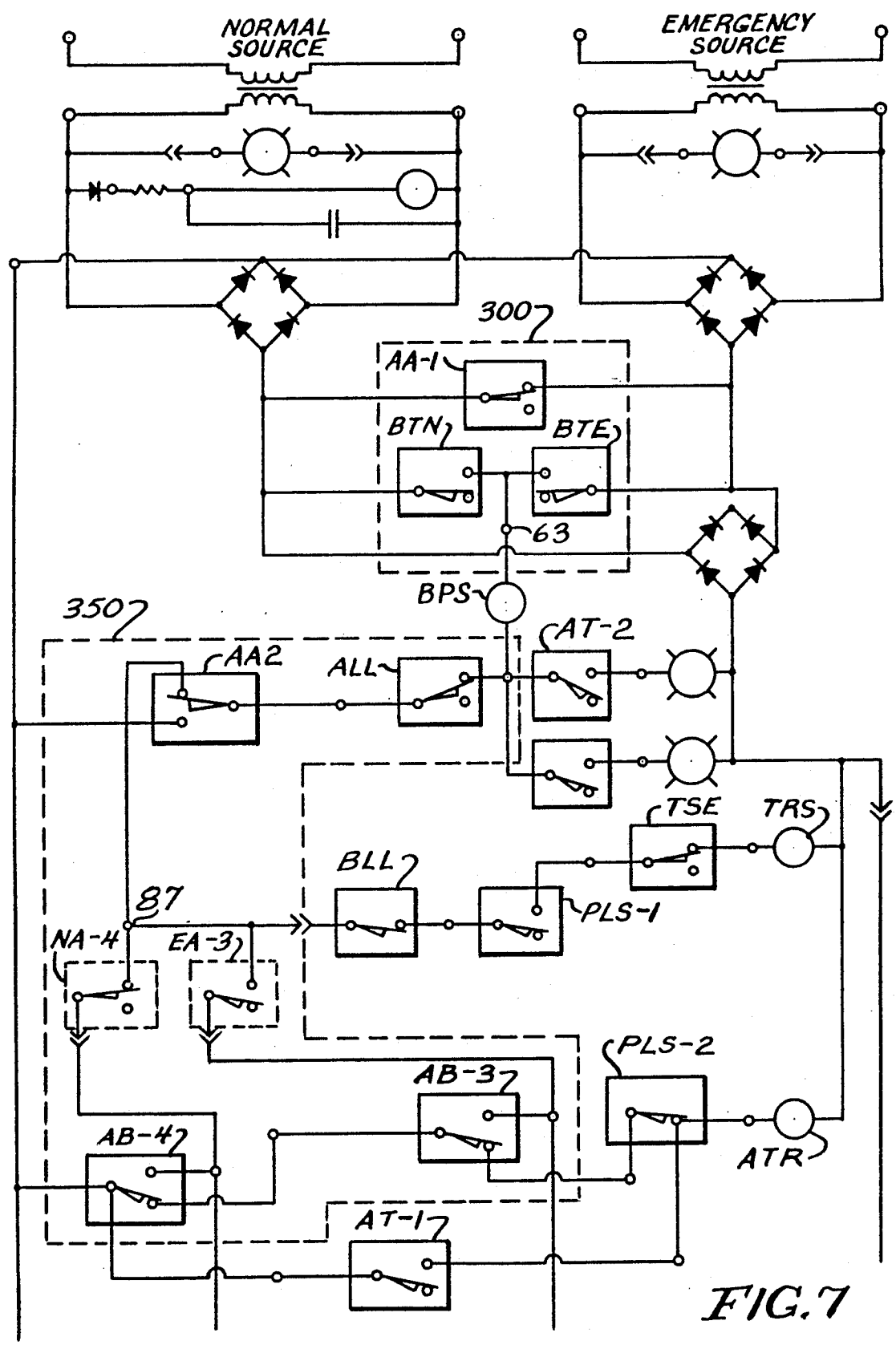
FIG. 7 is a circuit diagram depicting the switching logic employed in the interlock of the present invention.

Referring to FIG. 7, a bypass solenoid BPS is provided to restrict movement of the mechanical interlock system under certain conditions indicated by several of the switches shown in FIG. 7. A primary function of bypass solenoid BPS is the prevention of opening of bypass/isolation switch 110 from one power source when the other source is dead, to prevent the closing of the switch into that dead source. Before bypass solenoid BPS may be energized, it must receive power from both an upper circuit (designated by box 300 in FIG. 7) and a lower circuit (designated by box 350).

Referring to Box 350, switch AA-2 is actuated when automatic transfer switch location handle 400 (FIG. 8D) is locked in the AUTO position. In this position, automatic transfer switch 100 may shift from normal to emergency under preset conditions, according to its normal operation. Switch ALL is actuated when automatic transfer switch location handle 400 is locked into one of the AUTO, TEST or ISOLATE positions; thus, when switch AA-2 is actuated because automatic transfer switch location handle 400 is in AUTO, ALL will also be actuated. Power may thus flow through the circuit to point 63, providing energy to the bypass solenoid from the lower circuit 350.

Figure 8:
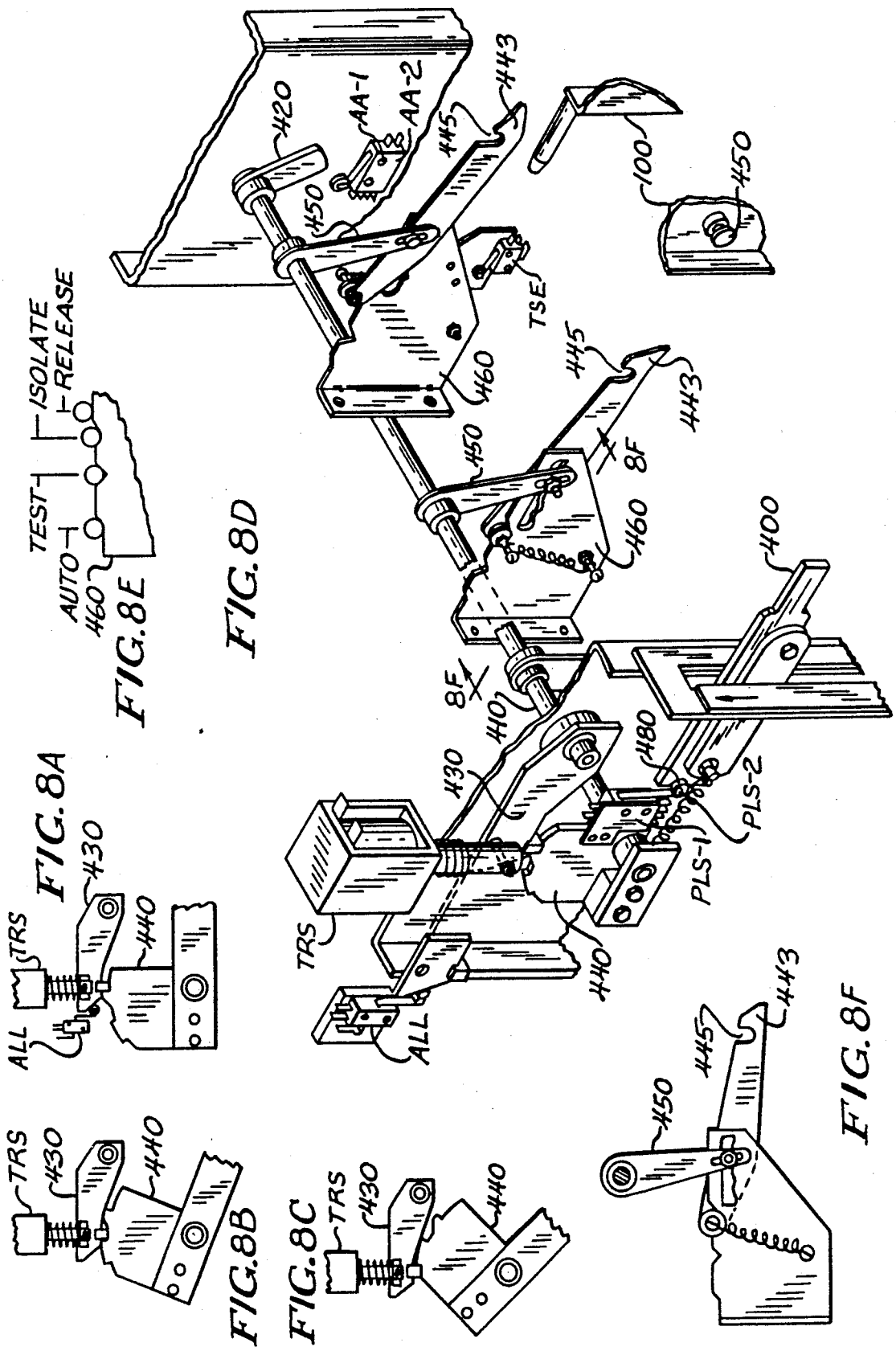
FIGS. 8A, 8B and 8C are perspective drawings showing the interaction between the automatic transfer switch location handle and a locking latch pawl.
FIG. 8D is a perspective drawing showing the automatic transfer switch location handle and related apparatus for operation of the interlock system.
FIG. 8E is a drawing showing detent positions for engaging the automatic transfer switch.
FIG. 8F is an illustration of the pivot arms and the pick up arms.

Switch AA-2 is actuated as a result of mechanical action of automatic transfer switch location handle 400 shown as shown in FIG. 8D. Automatic transfer switch location handle 400 joined to shaft 410, which includes tab 420 for closing switch AA-2. Tab 420 is positioned on shaft 410 to actuate switch AA-2 when automatic transfer switch location handle 400 is in the AUTO position.

Similarly, switch ALL is actuated by the mechanical action of latch pawl 430, as shown in FIG. 8D. Latch pawl 430 is shaped to provide this closing action when automatic transfer switch location handle 400 is in one of AUTO, TEST or ISOLATE positions.

Power is provided through this portion of the circuit when bypass/isolation switch 110 and automatic transfer switch 100 are actuated into the same source. This is tested through switch operations at switches NA-4, EA-4, AB-4 and AB-3. When automatic transfer switch 100 is closed into the normal source, switch NA-4 is actuated; conversely, when automatic transfer switch 100 is closed into the emergency source, switch EA-3 is actuated, and NA-4 is opened.

A similar operation actuates switch AB-4 when bypass/isolation switch 110 is closed into normal, and actuates switch AB-3 when bypass/isolation switch 110 is closed into emergency.

In order for power to flow to point 87, from which switch AA-2 may draw power when automatic transfer switch 100 is in AUTO, both switches NA-4 and AB-4 must be actuated (automatic transfer switch and bypass closed into normal) or both switches EA-3 and AB-3 must be actuated (automatic transfer switch and bypass closed into emergency).

Switches NA-4, AB-4, EA-3 and AB-3 are actuated by the movement of mechanical portions of the automatic transfer and bypass/isolation switches, as indicated by their locations in FIG. 1. Both the automatic transfer and bypass/isolation switches include two switch shafts, one for emergency and one for normal, which rotate the switch into the appropriate source. Rotation of bypass-emergency switch shaft 250 actuates switch AB-3; rotation of bypass-normal switch shaft 255 actuates switch AB-4. Because bypass/isolation switch 110 may be closed into only one source at any given time, one of these switches will be actuated at any given time.

Similarly, rotation of automatic-normal switch shaft 260 actuates switch NA-4, while rotation of automatic-emergency switch shaft 265 actuates switch EA-3.

When automatic transfer switch 100 is not locked into the AUTO position, switches NA-4, AB-4, EA-3 and AB-3 are not involved in the flow of power to switch AA-2, since AA-2 is unactuated and draws power independently of whether automatic transfer switch 100 and bypass/isolation switch 110 are locked into the same source. This is shown in FIG. 7. Power flow to bypass solenoid BPS from lower circuit 350 therefore requires that switch ALL is actuated (automatic transfer switch location handle 400 locked into AUTO, TEST or ISOLATE). If switch ALL is actuated, power flows to bypass solenoid BPS; if unactuated, no power flows to bypass solenoid BPS.

Referring to FIG. 7, actuation of bypass solenoid BPS also requires power from upper circuit 300. In upper circuit 300, switch AA-1 is actuated when automatic transfer switch 100 is locked into the AUTO position, by the same mechanical action described above with reference to switch AA-2. Closure of this switch results in energy flow from either the normal or emergency sources to both switches BTN and BTE, since actuated switch AA-1 bridges the circuit drawing power from either source.

Switch BTN is actuated when bypass handle 115 is operated to shift from emergency to normal. Similarly, switch BTE is actuated when bypass handle 115 is moved from normal to emergency. In each case, bypass handle 115 moves through the open position, and thus movement from either source to the open is also affected by the closure of the BTN or BTE switches.

Closure of switches BTN and BTE occurs as a result of mechanical action between the switches and tab 105, joined to rod 140, as shown in FIG. 1. Tab 105 is shaped to actuate switches BTN and BTE when bypass handle 115 is moved from the open to the normal or emergency positions, respectively. FIGS. 3 and 4 illustrate the relationship of tab 105 with switches BTN and BTE, respectively.

When automatic transfer switch 100 is operating in AUTO, and AA-1 is actuated, power flows to both switches BTN and BTE from either the normal or emergency source. Bypass/isolation switch 110 can therefore move in either direction (from normal to emergency or vice-versa) when one source is live, since energy will flow through switches BTN or BTE to bypass solenoid BPS, permitting it to energize if conditions in lower circuit 350 are satisfied. The mechanical interlocks discussed above, however, operate to prevent bypass/isolation switch 110 from closing into the source opposite the source into which automatic transfer switch 100 is closed.

When automatic transfer switch 100 is not in AUTO, switch BTN requires that the normal source be active before power can flow through switch BTN. Thus, if the normal source is dead, no power will flow through switch BTN, and bypass solenoid BPS will not be energized, preventing bypass handle 115 from being moved from emergency to open or normal. Likewise, if the emergency source is dead, bypass solenoid BPS will not receive energy from upper circuit 300 through switch BTE, thereby preventing bypass handle 115 from being moved to open or emergency from normal.

Flow of energy to bypass solenoid BPS from both upper circuit 300 and lower circuit 350, as a result of all switch conditions being satisfied in a particular case, energizes bypass solenoid BPS and permits movement of bypass handle 115 to an open position, or to the opposite, live source.

Figure 9:
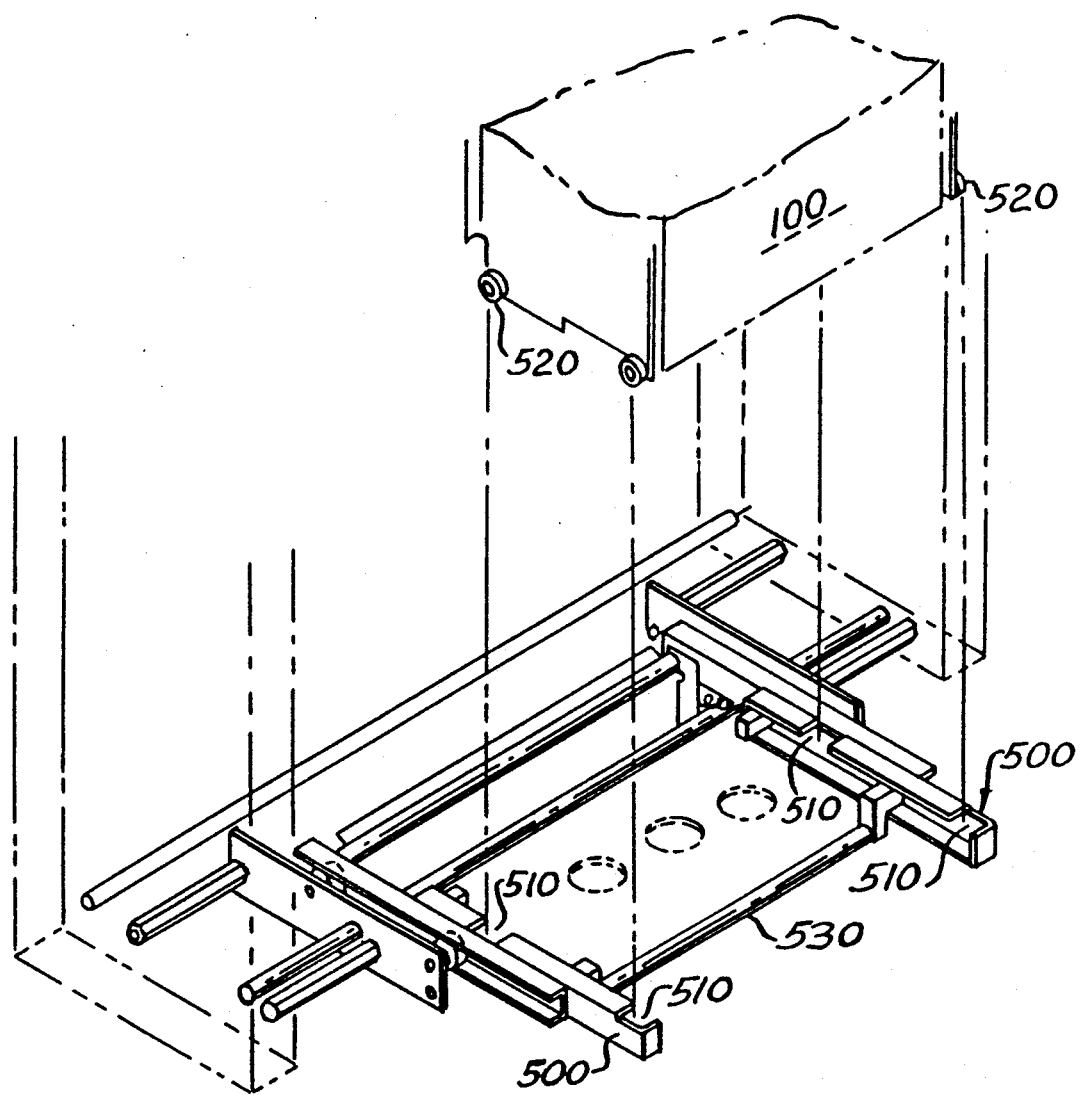
FIG. 9 is a drawing showing the retractable table for support of the automatic transfer switch as it relates to the interlock system of the present invention.

A retractable table is provided for supporting automatic transfer switch 100 and for positioning it in AUTO, TEST, and ISOLATE positions. The retractable table is also designed for releasing automatic transfer switch 100 from a supporting frame, including the retractable table. As shown in FIG. 9, the retractable table comprises at least two bearing-mounted retract rails 500 having a plurality of slots 510 to accept rollers 520 mounted on automatic transfer switch 100. Upon retraction of automatic transfer switch 100, these slots eclipse the automatic transfer switch rollers 520, locking automatic transfer switch 100 into position.

It has also been found desirable to provide rails 500 with one or more table spacers 530 to prevent improper alignment of the table with automatic transfer switch 100.

Also supporting automatic transfer switch 100, as shown in FIGS. 8D and 8F, are pick up arms 443 operably connected to shaft 410. Pick up arms 443 include receiving slots 445 for receiving pick-up studs 450 mounted to automatic transfer switch 100, for securely holding automatic transfer switch 100 in location. As movement of automatic transfer switch location handle 400 causes rotation of shaft 410, pivot arms 450 move pick up arms 443 forward or backward to detent positions, as shown in FIG. 8D. Pick up arms 443 disengage automatic transfer switch 100 when automatic transfer switch location handle 400 is moved to the RELEASE position. Pick up arms 443 are spring biased against detent brackets 460, locking pins 470 (mounted on pick up arms 443) into the selected detent positions.

Operation of automatic transfer switch location handle 400 cause the rotation of latch cam 440. Latch cam 440 is shaped to provide locking with latch pawl 430 when automatic transfer switch location handle 400 is in one of three preset locations: AUTO, TEST and ISOLATE. The configuration of latch cam 440 and latch pawl 430 in each of these locations is shown in FIGS. 8A, 8B and 8C. As shown, latch pawl 430 must be withdrawn before automatic transfer switch location handle 400 may be moved, as a result of the locking portions of latch cam 440. This is accomplished by actuation of transfer release solenoid TRS.

The circuit permitting actuation of transfer release solenoid TRS, and therefore movement of automatic transfer switch location handle 400, is shown in FIG. 7. Switch TSE is actuated when automatic transfer switch 100 is engaged in pick-up arms 443, as a result of mechanical interaction with probe 470 mounted on automatic transfer switch 100. Thus, before latch pawl 430 may be released, and automatic transfer switch location handle 400 moved, automatic transfer switch 100 must be engaged in pick-up arms 443.

As shown in FIG. 8D, switch PLS-1 is actuated during the operation of automatic transfer switch location handle 400 as a result of mechanical interaction between switch PLS-1 and notch 480 on automatic transfer switch location handle 400. While inside notch 480, switch PLS-1 rests in an open position; upon movement of automatic transfer switch location handle 400 in either direction, however, switch PLS-1 is actuated. Notch 480 is sized to allow switch PLS-1 to be actuated upon small movement of automatic transfer switch location handle 100.

Thus, latch pawl 430 is locked into position by transfer release solenoid TRS when automatic transfer switch location handle 400 is not being operated, preventing automatic transfer switch 100 from slipping out of a set position.

Another requirement for movement of automatic transfer switch 100 is that the bypass/isolation switch 110 is locked into one of the sources. This is tested by switch BLL, shown in FIG. 7, which is actuated when bypass/isolation switch 110 is locked. As indicated in FIGS. 1 through 4, closure of switch BLL is accomplished by mechanical interaction between rod 123 and switch BLL when bypass/isolation switch 110 is locked into a location. As shown in FIGS. 2 through 4, rod 123 is shaped to actuate switch BLL when bypass/isolation switch 110 is locked into position, and bypass solenoid BPS is not energized. When bypass/isolation switch 110 is not locked into a location, however, and/or bypass solenoid BPS is energized (i.e., bypass location handle 115 is being operated), rod 123 is shaped to deactuate switch BLL.

Thus, if bypass/isolation switch 110 is being moved from one location to another, or is not locked into a source or open, automatic transfer switch location handle 400 cannot be moved, since latch pawl 430 is locked by transfer release solenoid TRS, through the action of switch BLL.

Finally, it is necessary that bypass/isolation switch 110 and automatic transfer switch 100 are closed into the same source before the transfer release solenoid is energized and automatic transfer switch location handle 400 may be moved. This is tested using the same conditions for switches NA-4, AB-4, EA-3 and AB-3, as set forth above with respect to bypass solenoid BPS. Power is supplied to transfer release solenoid TRS through either the combination of normal switches NA-4 and AB-4 or emergency switches EA-3 and AB-3.

It is desirable to form latch cam 440 so that movement of automatic transfer switch 100 from the TEST position to the ISOLATE position does not require that the transfer release solenoid circuit shown in FIG. 7 be actuated. This is desirable, as it eases examination of automatic transfer switch 100 by providing a simple withdrawal of automatic transfer switch 100 from the frame. One configuration of latch cam 440 to accomplish this is shown in FIGS. 8A–8D.

With this desirable latch cam configuration, withdrawal of latch pawl 430 is still necessary to move automatic transfer switch 100 from the ISOLATE to the TEST position. This prevents the inadvertent engagement of the automatic transfer switch 100 from the isolation position.

A summary of all switch positions corresponding t given conditions is shown in Table I.

TABLE I

| | LIMIT SWITCH CHART (X = actuated) | | | | | | | | |
|---|---|---|---|---|---|---|---|---|---|
| | ATS LOCATION | | | | ATS POSITION | | BYPASS POSITION | | |
| SWITCH | AUTO | TEST | ISO | REMOVE | NORMAL | EMERGENCY | NORMAL | EMERGENCY | OPEN |
| AA-1,2 | X | | | | | | | | |
| AT-1,2 | | X | | | | | | | |
| ALL | X | X | X | X | | | | | |
| TSE | X | X | X | | | | | | |
| NA-4 | | | | | X | | | | |
| EA-3 | | | | | | X | | | |
| AB-4 | | | | | | | X | | |
| AB-3 | | | | | | | | X | |
| BLL | | | | | | | X | X | X |
| PLS-1,2 | ACTUATED WHEN Automatic transfer switch LOCATION HANDLE IS OPERATED | | | | | | | | |
| BTN | ACTUATED WHEN BYPASS HANDLE IS MOVING FROM EMERGENCY TO NORMAL | | | | | | | | |
| BTE | ACTUATED WHEN BYPASS HANDLE IS MOVING FROM NORMAL TO EMERGENCY | | | | | | | | |

Finally, FIG. 7 shows the circuit for the auto/test relay ATR. Auto/test relay ATR allows automatic transfer switch 100 to transfer in either direction, from emergency to normal or vice-versa. Switch PLS-2 controls the flow of energy to the ATR, opening when automatic transfer switch location handle 400 is moved, according to the same mechanical operation as described above for PLS-1. Thus, auto/test relay ATR is not energized when automatic transfer switch location handle 400 is moved, and the location of automatic transfer switch 100 concomitantly varied. This is desirable to prevent switching during movement of automatic transfer switch 100, reducing the hazards associated with closure into the wrong source.

To operate automatic transfer switch 100 in the TEST position, however, it is desirable to permit energy flow to the ATR. In the test position, switch AT-1 is actuated to permit power to flow to automatic transfer switch 100 even if switch PLS-2 is open.

The present invention has been described with respect to certain embodiments and conditions, which are not meant to and should not be construed to limit the invention. Those skilled in the art will understand that variations from the embodiments and conditions described herein may be made without departing from the invention a claimed in the appended claims.

What is claimed is:

1. A safety interlock system for a bypass/isolation automatic transfer switch, including an automatic transfer switch for automatic switching between normal and emergency power sources according to preset criteria and a manually operated bypass/isolation switch for bypassing the automatic transfer switch to permit servicing of the automatic transfer switch, the bypass/isolation automatic transfer switch being received in a frame, the automatic transfer switch being removable therefrom for servicing, the interlock system comprising:

mechanical interlock means for preventing the automatic transfer switch and the bypass/isolation switch from being mechanically closed into different power sources at the same time; and, electromechanical interlock means, operating in conjunction with the mechanical interlock means, for preventing the bypass/isolation switch, when closed into a live source, from being switched into a dead source, detecting means for automatically determining whether the normal or emergency power sources, or both of them, are live, whereby the electromechanical interlock system prevents switching into a dead source, the electromechanical interlock means further comprising means for preventing switching by the automatic transfer switch during movement of the automatic transfer switch outwardly from the frame for servicing.

2. The safety interlock system of claim 1, wherein the electromechanical interlock means includes a solenoid preventing movement of the mechanical interlock means unless the power source opposite that into which the bypass/isolation switch is closed is live at the time of switching.

3. The safety interlock system of claim 1, wherein the electromechanical interlock system includes a solenoid preventing movement of the mechanical interlock means unless the automatic transfer switch and bypass/isolation switch are locked into the same source.

4. The safety interlock system of claim 3, wherein the automatic transfer switch is removably engaged in the retractable table means.

5. The safety interlock system of claim 1, wherein the mechanical interlock system includes means moving with the automatic transfer switch during its withdrawal from the frame to prevent switching from one power source to the other during withdrawal and insertion.

6. The safety interlock system of claim 1, further comprising retractable table means operably connected to the frame for supporting the automatic transfer switch while permitting movement of switch outwardly of the frame.

7. The safety interlock system of claim 1, further comprising means for testing that the automatic transfer and bypass/isolation switches are closed into the same source before the automatic transfer switch may be moved outward from the frame.

8. The safety interlock system of claim 1, wherein said automatic transfer switch further comprises means for withdrawing the automatic transfer switch from its frame in a single stroke operation without load interruption.

9. A safety interlock system for a bypass/isolation automatic transfer switch, including an automatic transfer switch for automatic switching between normal and emergency power sources according to preset criteria and a manually operated bypass/isolation switch for bypassing the automatic transfer switch to permit servicing of the automatic transfer switch, the bypass/isolation automatic transfer switch being received in a frame, the automatic transfer switch being removable therefrom for servicing, the interlock system comprising:

mechanical interlock means for preventing the automatic transfer switch and the bypass/isolation switch from being mechanically closed into different power sources at the same time;

electromechanical interlock means, operating in conjunction with the mechanical interlock means, for preventing the bypass/isolation switch, when closed into a live source, from being switched into a dead source, detecting means for automatically determining whether the normal or emergency power sources, or both of them, are live, whereby the electromechanical interlock system prevents switching into a dead source, the electromechanical interlock means further comprising means for preventing switching by the automatic transfer switch during movement of the automatic transfer switch outwardly from the frame for servicing;

means for testing that the automatic transfer and bypass-isolation switches are closed into the same source before the automatic transfer switch may be moved outwardly of the frame; and, retractable table means operably connected to the frame for supporting the automatic transfer switch while permitting movement of switch outward from the frame.

10. The safety interlock system of claim 9, wherein the electromechanical interlock means includes a solenoid preventing movement of the mechanical interlock means unless the power source opposite that into which the bypass/isolation switch is closed is live at the time of switching.

11. The safety interlock system of claim 9, wherein the electromechanical interlock system includes a solenoid preventing movement of the mechanical interlock means unless the automatic transfer switch and bypass/isolation switch are locked into the same source.

12. The safety interlock system of claim 9, wherein the mechanical interlock system includes means moving with the automatic transfer switch during its withdrawal from the frame to prevent switching from one power source to the other during withdrawal and insertion.

13. The safety interlock system of claim 9, wherein the automatic transfer switch is removably engaged in the retractable table means.

14. A safety interlock system for a bypass/isolation automatic transfer switch, including an automatic transfer switch for automatic switching between normal and emergency power sources according to preset criteria and a manually operated bypass/isolation switch for bypassing the automatic transfer switch to permit servicing of the automatic transfer switch, the bypass/isolation automatic transfer switch being received in a frame, the automatic transfer switch being removable therefrom for servicing, the interlock system comprising:
- mechanical interlock means for preventing the automatic transfer switch and the bypass/isolation switch from being mechanically closed into different power sources at the same time;
- electromechanical interlock means, operating in conjunction with the mechanical interlock means, for preventing the bypass/isolation switch, when closed into a live source, from being switched into a dead source,
- detecting means for automatically determining whether the normal or emergency power sources, or both of them, are live, whereby the electromechanical interlock system prevents switching into a dead source,
- wherein the electromechanical interlock means includes a solenoid preventing movement of the mechanical interlock means unless the power source opposite that into which the bypass/isolation switch is closed is live at the time of switching, and preventing movement of the mechanical interlock means unless the automatic transfer switch and bypass/isolation switch are locked into the same source,
- the electromechanical interlock means further including means for preventing switching by the automatic transfer switch during movement of the automatic transfer switch outwardly from the frame for servicing;
- means for testing that the automatic transfer and bypass/isolation switches are closed into the same source before the automatic transfer switch may be moved outwardly of the frame; and,
- retractable table means operably connected to the frame for supporting the automatic transfer switch while permitting movement of switch outward from the frame, the automatic transfer switch being removably received by the retractable table means.

15. The safety interlock system of claim 14, wherein the mechanical interlock system includes means moving with the automatic transfer switch during its withdrawal or insertion from the frame to prevent switching from one power source to the other during withdrawal.

* * * * *